United States Patent [19]

Bahns

[11] Patent Number: 5,335,238
[45] Date of Patent: Aug. 2, 1994

[54] APPARATUS AND METHOD FOR GUIDING AN ELECTRIC DISCHARGE WITH A MAGNETIC FIELD

[75] Inventor: John T. Bahns, Iowa City, Iowa

[73] Assignee: The University of Iowa Research Foundation, Iowa City, Iowa

[21] Appl. No.: 45,056

[22] Filed: Apr. 8, 1993

Related U.S. Application Data

[63] Continuation-in-part of Ser. No. 926,294, Aug. 10, 1992.

[51] Int. Cl.⁵ .................. H01S 3/094; H01S 3/097; H05H 1/18
[52] U.S. Cl. ........................ 372/37; 372/72; 372/76; 372/86; 315/111.41
[58] Field of Search .............. 372/69, 70, 71, 72, 372/55, 56, 86, 87, 37; 315/111.21, 111.41, 111.71, 111.81

[56] References Cited

U.S. PATENT DOCUMENTS

| | | | |
|---|---|---|---|
| 3,887,882 | 6/1975 | Smith | 372/86 |
| 4,937,832 | 6/1990 | Rocca | 372/37 X |
| 4,974,228 | 11/1990 | Petersen | 372/37 |
| 5,153,892 | 10/1992 | Kawakubo et al. | 372/87 |
| 5,225,740 | 7/1993 | Ohkawa | 315/111.41 |

OTHER PUBLICATIONS

E. I. Asinousky et al, "Guided Electric Discharge In Air", XVIII International Conference on Phenomena in Ionized Gases, Swansea, Jul. 13–17, 1987.

M. L. Brake, "Energy Deposition in Metals by Laser—Guided Discharges", Plasma Chemistry and Plasma Processing, vol. 3, No. 4 1983 (no month).

Imasaki et al., "$CO_2$ Laser Guided Plasma Channel for Light Ion Beam Transport", Journal of the Physical Society of Japan, vol. 50, No. 12, Dec. '81, pp. 3847–3848.

Greig et al., "Electrical Discharges Guided by Pulsed $CO_2$ Laser Radiation", Physical Review Letters, vol. 41, #3, Jul. 1978, pp. 174–177.

Kasuya et al., "Laser Produced Alkaline Metal Plasmas . . . Experiments", Laser Interaction and Related Plasma Phenomena, vol. 8, pp. 149–162, Plenum Press, NY, presented at Naval Postgraduate School, Monterey, Calif., Oct. 26–30 1987.

Guenther et al., "Recent Advances in Optically Controlled Discharges, Air Force Weapons Laboratory", XVIII International Conference on Phenomena in Ionized Gases, Swansea 13th–17th Jul. 1987.

Olsen et al., "Laser Heating of a Molecular Gas Channel" Unlimited Release, U.S. Dept. of Energy under Contract DE-AC04-76-DP00789, Jun. 1980.

Clark et al., "Discharges in Long Metal Tubes", XVIII International Conference on Phenomena in Ionized Gases Swansea, Jul. 13–17, 1987.

G. M. Weyl, "Ionisation path formation in gases using a laser with retractable focus", J. Phys. D.: Appl. Phys., vol. 12, 1979, pp. 33–49, (no month).

(List continued on next page.)

Primary Examiner—James W. Davie
Attorney, Agent, or Firm—Mark L. Fleshner

[57] ABSTRACT

A device and method for generating and guiding an electric discharge current including a first electrode, a second electrode and a material arranged between the first and second electrodes. The device and method involve the use of a laser for generating photons having energies equal to the energy between two excited electronic states of the material. The photons fill a region of the material from the first electrode through the material to the second electrode, ionizing the region of the material between the first and second electrodes. A voltage generating unit connected to the first and second electrodes applies a voltage between the first and second electrodes thereby generating the electric discharge which follows an ionized path in the region between the first and second electrodes. A solenoid is arranged around the housing so that the magnetic field which it produces is oriented approximately along the ionized path, thereby providing improved confinement of the electric discharge.

19 Claims, 15 Drawing Sheets

OTHER PUBLICATIONS

Labun, et al., "Spark channel plasma electrode", Appl. Phys. Lett., vol. 58, No. 23, 10 Jun. 1991.

Olsen et al., "Ion beam transport in laser-initiated discharge channels", J. Appl. Phys. 53(5), pp. 3397–3404, May 1982.

Korolev et al., "Some Possibilities of the MSL-2 Apparatus for Electric Discharge Microanalysis with Laser Stabilization of the Discharge Channel", Translated from Zhurnal Prikladnoi Spektroskopli, V19, #3, Sep. 1973.

Hijikawa et al., "Electrical discharge channel in cesium vapor initiated by a XeCl laser", Appl. Phys. Lett. 45 (3), pp. 234–236, 1 Aug. 1984.

Horioka et al., "Laser initiation of an electrical discharge channel in cesium contained gas", J. Appl. Phys. 59(11), pp. 3722–3727, 1 Jun. 1986.

Tamura et al., "Electrical Discharge Channel in Sodium Vapor Initiated by Resonant Laser Light", Japanese Journal of Applied Physics, vol. 22, No. 7, pp. L417–L419, Jul. 1983.

Saum et al., "Discharges Guided by Laser-Induced Rare-faction Channels", The Physics of Fluids, vol. 15 (11), Nov. 1972.

Sasaki et al., "Characteristics of Interelectrode . . . (248 nm)", J. Appl. Phys. 60 (11), pp. 3845–3849, 1 Dec. 1986.

Olsen et al., "Laser-initiated channels for ion . . . evolution", J. Appl. Phys. 52 (5), pp. 3286–3292, May 1981.

Greig et al., "Electrical Discharges Guided by . . . Radiation", Physical Review Letters, vol. 41 (3), pp. 174–177 17 Jul. 1978.

Smith et al, "Gas laser discharges . . . tubes", J. Phys. D: Appl. Phys., vol. 7, pp. 2455–2463, 1974 (no month).

Brooks et al., "Glow Discharges", XI Int. Conference on Phenomena in Ionized Gases, 1973, Ed. I. Stoll et al. Prague, Czechoslovakia, Sep. 10–14, 1973.

"Lightning Lure", Scientific American, p. 105, Feb. 1993.

Cesium Grotrian diagram, energies are in (cm−1/1000)

APPARATUS AND METHOD FOR GUIDING AN ELECTRIC DISCHARGE WITH A MAGNETIC FIELD

This application is a continuation-in-part application of U.S. Application Ser. No. 07/926,294 incorporated herein by reference.

BACKGROUND OF THE INVENTION

1. Field of the Invention

This invention relates generally to an apparatus and a method for guiding an electric discharge and in particular, to a laser guided discharge device which is capable of guiding a discharge current between two electrodes wherein laser light and an external magnetic field provide a guiding wall.

2. Description of Related Art

Traditionally, "wall-guided" gas discharge tubes have been used in lasers, flashlamps, etc . . . Such a discharge tube guides an electric discharge in a gas between two electrodes using the inner wall of the tube containing the gas. In order to avoid shorting out the electric discharge, the inner wall of such a tube must be made of electrically insulating materials such as glass or ceramic. In addition, in order to prevent corrosion and consequently prolong the life of the tube, the inner wall of the tube must be made of materials which do not chemically react with the gas.

The above two requirements place severe limitations on the types of materials which can be used to make discharge tubes. For example, metals such as steel, tungsten and nickel cannot be used to guide an electric discharge between electrodes in "wall-guided" discharge tubes, because although they possess particular advantages for housing gases such as high impact resistance, longevity and design flexibility, they are not electrically insulating. Also, if the gas is a metal vapor such as an alkali (group IA of the periodic table), alkaline earth metals (group IIA of the periodic table) or some other transition element (groups IIIA to VIIIA, IB and IIB), a non-metallic tube cannot be used to guide the electric discharge, because eventually, atoms in the gas will accumulate on the inner walls of the tube and chemically or physically attack those inner walls. This can result in shorting out or destroying the walls of the tubes as well as and other components of the device.

Very high powered lasers such as carbon dioxide lasers of several hundred megawatts can be used to direct or guide lightening bolts, see, for example, "Lightening Lure", page 105, *Scientific American*, Feb. 1993. However, such high powered lasers are expensive, dangerous and can only guide lighting bolts a short distance (e.g. about 10 meters).

Laser guided discharge (LGD) devices such as those disclosed in U.S. Application Ser. No. 07/926,294 alleviate the above problems by guiding an electric discharge in a material without using a guiding tube. LGD devices can also guide electric discharge devices in materials that are intrinsically incompatible (chemically or physically) such as metal vapors with present day wall materials. LGD devices accomplish this by using laser photons tuned to an electronic quasi-resonance of the material, thus creating and sustaining a channel that guides the electric discharge between the electrodes.

LGD devices are capable of operating under high power conditions, i.e., conditions where a power supply across the electrodes of the LGD device is over several hundred watts. Such a high power LGD device typically requires a housing made of metal to withstand high pressures and typically operates under high power, high pressure, high current and high voltage conditions. Such metal housings, however, produce significant "wall losses", i.e. losses due to the presence of electric currents in the walls of the housing.

SUMMARY OF THE INVENTION

It is therefore an object of this invention to provide a method and an apparatus for safely guiding a discharge current in a material under high power conditions without using a guiding tube and with reduced wall losses.

Another object of the invention is to provide an apparatus and method for safely guiding an electric discharge in a material such as a metal vapor when the metal vapor is under high pressure even though the material is intrinsically incompatible (chemically or physically) with present day wall materials.

Another object of the invention is to make it possible to use metals housings, e.g., housings made from steel, tungsten or nickel to house gases in discharge tubes.

Another object of the invention is to make it possible to use alkali and alkaline earth metals as gases which support the electric discharge.

One feature of the invention is that it uses an external magnetic field producing unit such as a solenoid arranged about the material through which the electric discharge travels. This magnetic field together with photons generated from a light source such as a laser tuned to an electronic quasi-resonance of the material, creates and sustains a channel that guides the electric discharge between electrodes.

Another feature of the invention is that it uses independently powered heating wires in order to control initiation of the channel.

Another feature of the invention is that the material containing the electric discharge can be a gas, liquid or solid.

The above and other objects, advantages and features of the invention are accomplished by the provision of a device for generating and guiding an electric discharge current, including a first electrode; a second electrode; a material arranged between the first electrode and the second electrode; and a photon generating unit for generating photons having energies equal to a difference in energy between two excited electronic states of the material. These photons fill and ionize a region of the material between the first electrode and the second electrode. A voltage generating unit connected to the first and second electrodes applies a voltage between the first and second electrodes thereby generating the electric discharge which follows an ionized path in the region between the first and second electrodes. The device includes a unit for applying a magnetic field which is oriented in a direction approximately parallel to the ionized path in order to further confine the electric discharge to the ionized path.

In a further aspect of the invention, the unit for applying a magnetic field is a solenoid which encompasses a housing. The housing has a first end and a second end, and the first and second electrodes are arranged at one of the first and second ends of the housing.

In an alternative aspect of the invention, a housing is provided having a first end and a second end for housing the material and the first electrode is arranged at the first end of the housing and the second electrode is arranged at the second end of the housing.

In another aspect of the invention, the unit for applying photons applies photons in a first direction and the first and second electrodes are arranged so that the ionized path is approximately perpendicular to the first direction.

In an alternative aspect of the invention, the unit for applying photons applies photons in a first direction and the first and second electrodes are arranged so that the ionized path is approximately parallel to the first direction.

The above and other objects, advantages and features are further accomplished in accordance with the invention by the provision of a method for guiding an electric discharge between a first and second electrode, including the steps of: arranging a material between the first electrode and the second electrode; generating photons having energies equal to a difference in energy between two excited electronic states of the material; filling a region in the material, whereby this region extends from the first electrode through the material to the second electrode thereby ionizing the material between the first and second electrodes; applying a voltage between the first and second electrodes thereby generating the electric discharge which follows an ionized path in the region between the first and second electrodes; and applying a magnetic field oriented approximately along the ionized path in order to further confine the electric discharge to the ionized path.

The above and other objects, features and advantages of the present invention will become more apparent from the following description of embodiments thereof taken in conjunction with the accompanying drawings.

DESCRIPTION OF PREFERRED EMBODIMENTS

Figure 1A:
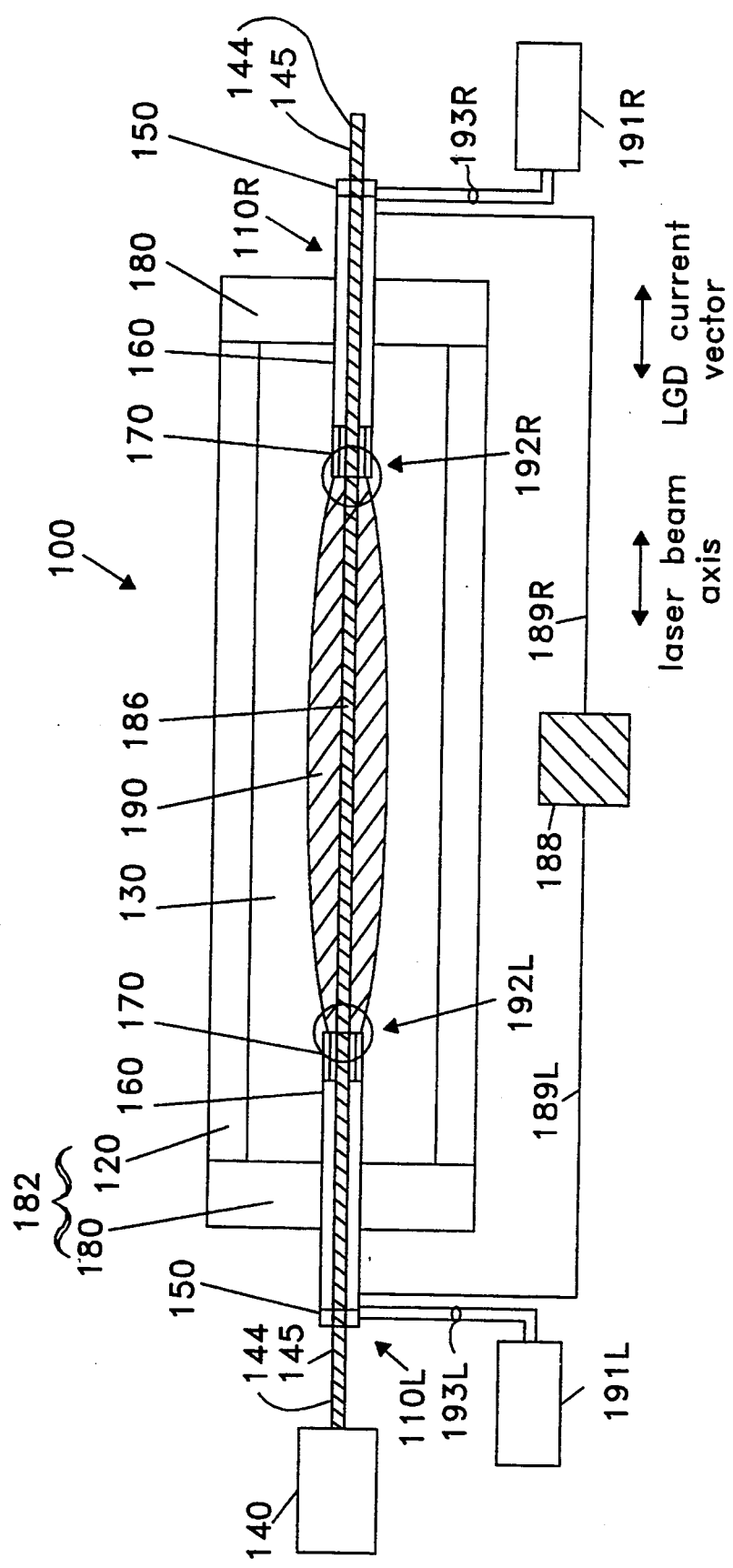
FIG. 1A is a schematic representation of a laser guided discharge (IX]D) device in a longitudinal configuration and FIGS. 1B and 1C are schematic representations of a magnetically assisted laser guided discharge (MALGD) device in a longitudinal configuration with a solenoid and a permanent magnet, respectively, according to the invention.

A magnetically assisted laser guided discharge tube includes a laser guided discharge tube such as the one shown in FIG. 1A. In particular, FIG. 1A shows a schematic representation of a laser guided discharge (LGD) device 100 having a longitudinal configuration. LGD device 100 has a left electrode 110L and a right electrode 110R on each end of a housing wall 120 which houses a gas 130. Laser 140 outputs a laser beam 144 which enters an electrode window 150 and travels along an electrode wall 160 through an electrode tip 170 and then passes through gas 130 to electrode 110R on the right hand side of LGD device 100.

Housing wall 120 has housing ends 180 on its left and right ends in order to provide support for left electrode 110L and right electrode 110R. Housing wall 120 and housing ends 180 comprise housing 182 which can be used to house or contain gas 130. Housing 182 can be cylindrical and can be made of any material capable of containing gas 130 including metals such as steel, nickel and/or tungsten. Gas 130 remains confined in housing 182 because electrode windows 150 seal left and right electrodes 110L and 110R while transmitting laser beam 144.

Laser beam 144 output by laser 140 creates a path 186 of ionized gas between left electrode 110L and right electrode 110R. A power source 188 generates a voltage between left electrode 110L and right electrode 110R. Path 186 of ionized gas then serves as a conductive link between electrode tips 170 of left electrode 110L and right electrode 110R.

More generally, any region in gas 130 becomes ionized when filled with photons from laser 140, i.e., which photons pass through it. Laser beam 144 enters electrode window 150 of left electrode 110L and exits from electrode window 150 of right electrode 110R. Left and right electrodes 110L and 110R are shaped so that laser beam 144 can pass through them without actually coming into contact with electrode tips 170. Otherwise, laser beam 144 would be scattered in multiple directions and consequently would ionize gas 130 in multiple directions. Also, even though laser beam 144 ionizes gas 130 creating ionized path 186, a discharge current induced by the voltage between left electrode 110L and right electrode 110R may not necessarily take path 186 and could instead be between electrode tip 170 of right electrode 110R and housing wall 120. To insure that the discharge current takes path 186, left and right electrodes 110L and 110R are provided with left and right heating power sources 191L and 191R, respectively. Left and right heating power sources 191L and 191R heat left and right regions 192L and 192R in the vicinity of electrode tips 170 of left electrode 110L and right electrode 110R, respectively. Left and right heating power sources 191L and 191R are each connected to a heating element (for example filament 210R in FIG. 2 for right heating power source 191R) via left and right wires 193L and 193R, respectively.

Power source 188 can be an AC and/or DC, pulsed, radio frequency (rf) or microwave power source. Wires 189L and 189R connect power source 188 to electrodes 110L and 110R, respectively. Power source 188 then becomes part of a completed circuit comprising wire 189L, electrode 110L, path 186, electrode 110R and wire 189R. A laser guided electric discharge is then generated along path 186. Also, a plasma region 190 is created in the approximate vicinity of path 186 due to electron impact ionization caused by the electric discharge.

Gas 130 can be a metal vapor such as alkali and alkaline earth metals (groups IA and IIA of the periodic table) or some other transition element (groups IIIA to VIIIA, IB and IIB). Also the material between left and right electrodes 110L and 110R need not be limited to a gas as will be discussed with reference to FIGS. 9A and 9B.

Laser 140 can be any type of laser including a gas laser such as an argon ion laser or a dye-laser. Laser 140 can also be a semi-conductor laser, a solid state laser etc . . . The source of photons for beam 144 can even be a lamp such as a sodium, mercury or xenon arc lamp. The main requirements on the photon source represented by laser 140 are that its beam 144 be tuned to a frequency such that the energy in each photon corresponds to the difference in energy between two excited electronic states in gas 130 and that its output power be sufficient to completely fill a region between left and right electrodes 110L and 110R, respectively, as will be discussed below.

A transition between a ground state and an excited state of a gas is generally referred to as a resonance of the gas, whereas a transition between two excited states of a gas is often referred to as a quasi-resonance of the gas. As mentioned above, the energy of photons in laser beam 144 must be equal to the difference in energy between an excited electronic state 2 and an excited electronic state 1, neither of which is the ground state of gas 130. If laser 140 outputs photons tuned to a resonance rather than a quasi-resonance of gas 130, laser beam 144 will be absorbed shortly after entering gas 130 at left electrode 110L. Increasing the power output by laser 140 does increase the distance laser beam 144 can travel in gas 130 before being completely absorbed. However, even if the power in laser beam 144 is as high as several kilowatts, if its photons are tuned to a resonance of gas 130, they will only travel a few centimeters before being absorbed by gas 130. On the other hand, if photons in laser beam 144 are tuned to a quasi-resonance of gas 130, path 186 between left electrode 110L and right electrode 110R can exceed several meters in length even though laser beam 144 is only a few milliwatts.

Figure 1B:
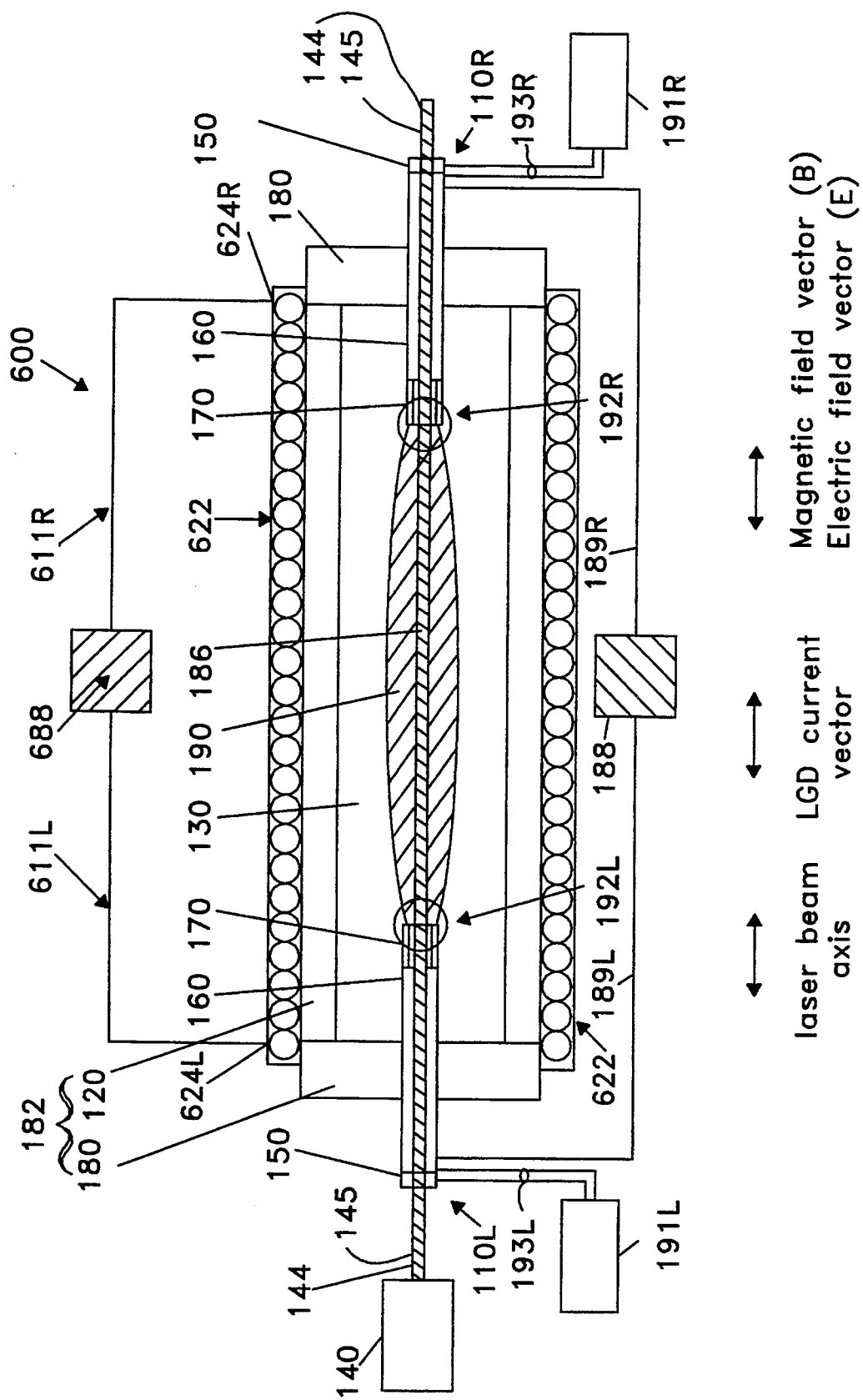

FIG. 1B is a schematic representation of a magnetically assisted laser guided discharge (MALGD) device 600 in a longitudinal configuration according to one embodiment of the invention. Identical reference numerals are used for those elements of MALGD device 600 which are common to longitudinal LGD device 100 of FIG. 1A. Here, however, a solenoid 622 surrounds housing 182. Solenoid 622 is connected at its left end 624L and its right end 624R to power supply 688 via leads 611L and 611R, respectively. Power supply 688 can be an AC and/or DC, pulsed, radio frequency (rf) or microwave power source. Alternatively, power supply 188 can be connected across left and right electrodes 110L and 110R, as well as across left and right ends 624L and 624R, respectively.

The effect of the magnetic field generated by solenoid 622 may be understood from the classical equations of motion for charged particles in electric and magnetic fields. The force on an electron or ion is given by the well known Lorentz (vector) equation.

$$F = q(E + V \times B),$$

where q is of the electron or ion charge, E and B are the resultant electric and magnetic fields and V is the velocity of the electrons or ions. The above equation states that a moving charged particle (an electron or ion) in a region (such as plasma region 190) where there are electric and magnetic fields, travels in a straight line in the direction of the resultant electric field E provided that its velocity V is parallel to B the resultant magnetic field. If this is not the case (i.e., V is not parallel to B), the charged particle experiences an additional "confining" force given by the second term ($V \times B$), which is perpendicular to V. Hence, particles with charge q that move in a direction perpendicular to magnetic field B, experience the above force F, which causes them to gyrate about magnetic field B in Larmor orbits with radii r, given by, $$r = mV/qB,$$

where m is the mass of the charged particle and V and B are the magnitudes of V and B, respectively.

It is desirable to choose B (the magnitude of B), m and V (the magnitude of V) so that r is smaller than the radial dimensions of the MALGD, thereby preventing electrons or ions from reaching the walls of the MALGD. The main requirements in utilizing these facts in the construction of a MALGD is that B and M be approximately parallel. Also, in order for charged particles of mass m to experience force F, walls 120 should be at least partially permeable to magnetic fields.

Figure 1C:
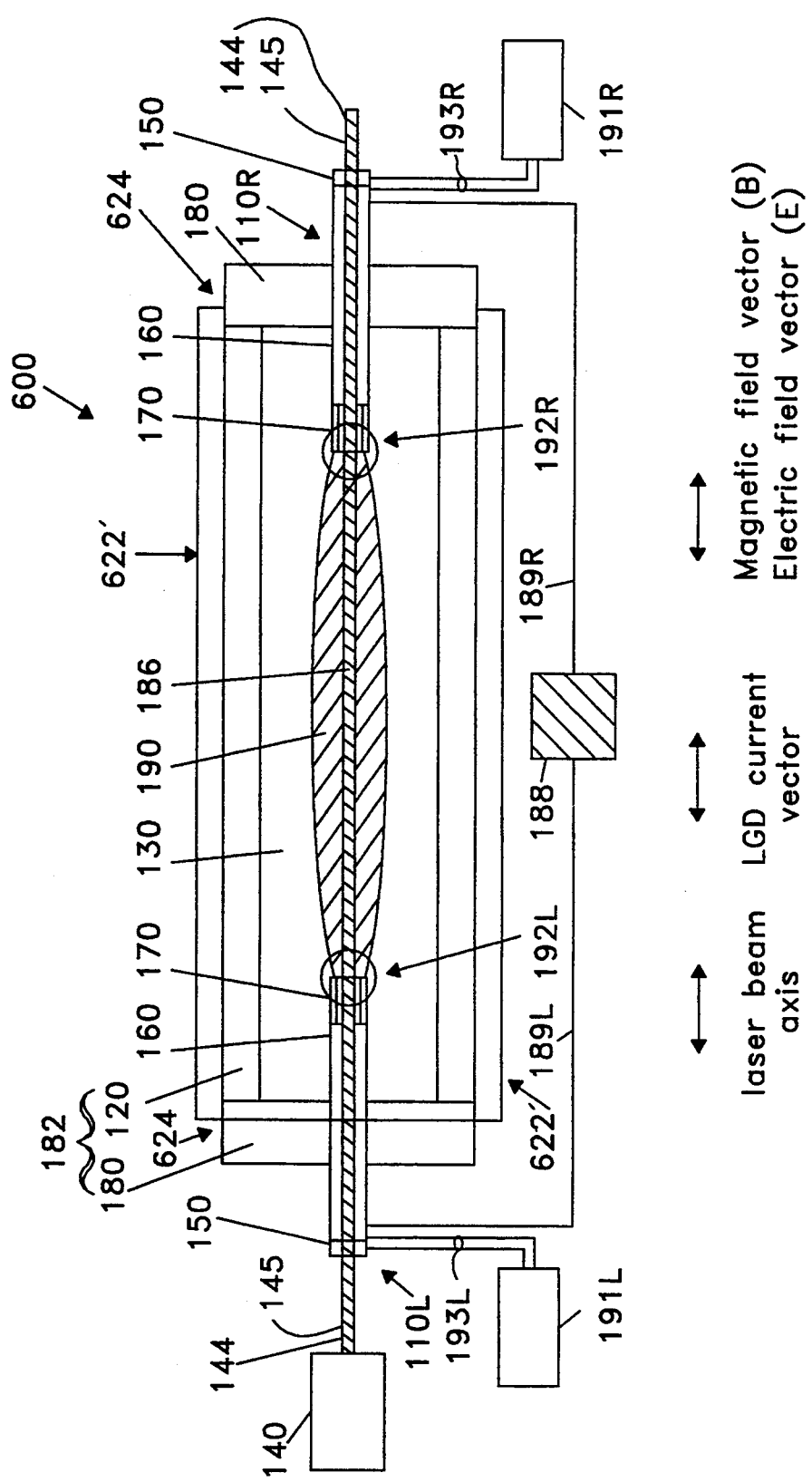

FIG. 1C is a schematic representation of a magnetically assisted laser guided discharge (MALGD) device 600 in a longitudinal configuration according to another embodiment of the invention. Identical reference numerals are used for those elements of MALGD device 600 in FIG. 1C which are common to longitudinal MALGD device 600 in FIG. 1B. Here, a permanent magnet 622' replaces solenoid 622 to produce the external magnetic field. Permanent magnetic 622' can be cylindrical with an annular region 624, or some other shape. The only requirement is that permanent magnet 622' be polarized in such a way that its resulting magnetic field is approximately parallel to the electric discharge.

Figure 2:
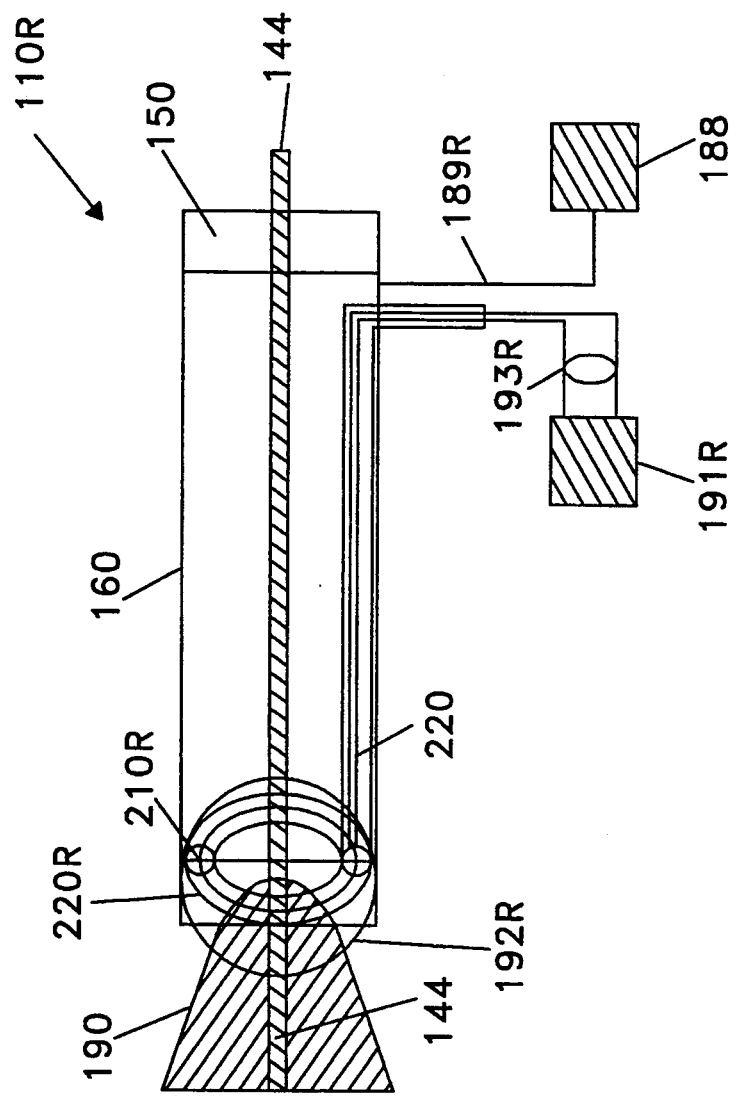
FIG. 2 is a schematic representation of the right electrode of the MALGD device with an insulated filament.

FIG. 2 is a more detailed schematic representation of right electrode 110R of MALGD device 600 in FIGS. 1B and 1C. The following discussion is directed to right electrode 110R but is applicable to left electrode 110L as well. Right heating power source 191R is coupled to a wire or filament 210R made of an electrically conductive material such as tungsten via wires 193R. Right heating power source 191R supplies a current through filament 210R which is insulated from gas 130 by an insulator 220R made of an electrically insulating material such as rubber, plastic, magnesium oxide, ceramic or glass and shaped as a hollow doughnut surrounding filament 210R.

Without any heating source, the region about electrode tips 170 becomes highly resistive. However, as filament 210R heats up, it creates a localized area 192R of low resistivity, thereby insuring that path 186 is a low resistance path through which the electric discharge will pass. A further advantage of using left and right filaments 210L and 210R at electrode tips 170 of left and right electrodes 110L and 110R, respectively, is that LGD device 100 can then be operated at lower voltages, i.e., the voltage between left electrode 110L and right electrode 110R can be maintained below 50 volts rather than in kilovolt ranges. Also, once the discharge current takes path 186 of laser beam 144, it produces its own low resistance path and its own magnetic field which in turn keeps the discharge current from deviating from path 186.

New photons can be generated by gas 130 and used for some other purpose. That is, atoms or molecules of gas 130 can be excited into excited electronic states via the discharge current. Then, when these excited atoms or molecules undergo electronic transitions from the excited states to lower states, they can generate output photons 145 (see FIG. 1) at electrode windows 150 of left and right electrodes 110L and 110R, respectively. Hence, LGD device 100 can be designed in such a way that output photons 145 are its end product. LGD device 100 can then itself function as a laser as will be discussed below. Alternatively, gas 130 together with laser 140 can be selected so that few or no output photons 145 are generated by the discharge current. In this case, the discharge current itself is the end product of LGD device 100. The discharge current can be used, for example, in micro-electronic device fabrication techniques such as deposition and etching processes where the discharge current can be manipulated by manipulating (e.g., focusing) laser beam 144. These adaptions of LGD device 100 will be discussed in more detail after the following discussion regarding selection of laser 140.

The required photon energy from laser beam 144 is determined uniquely by the electronic structure of the medium (or media) and its ions. First, it will be shown how the frequency of laser beam 144 is determined for a general atomic element used as gas 130. Then a particular example is given wherein gas 130 includes cesium atoms. Although a gas phase medium is considered here, it is important to realize that many of the principles presented here apply to any medium (or media) in any phase or mixture of phases (this includes liquids, solids, plasmas etc.). The approach centers on determining which processes will occur spontaneously for a given gas (liquid or solid) 130 in the presence of photons from laser beam 144.

Figure 3A:
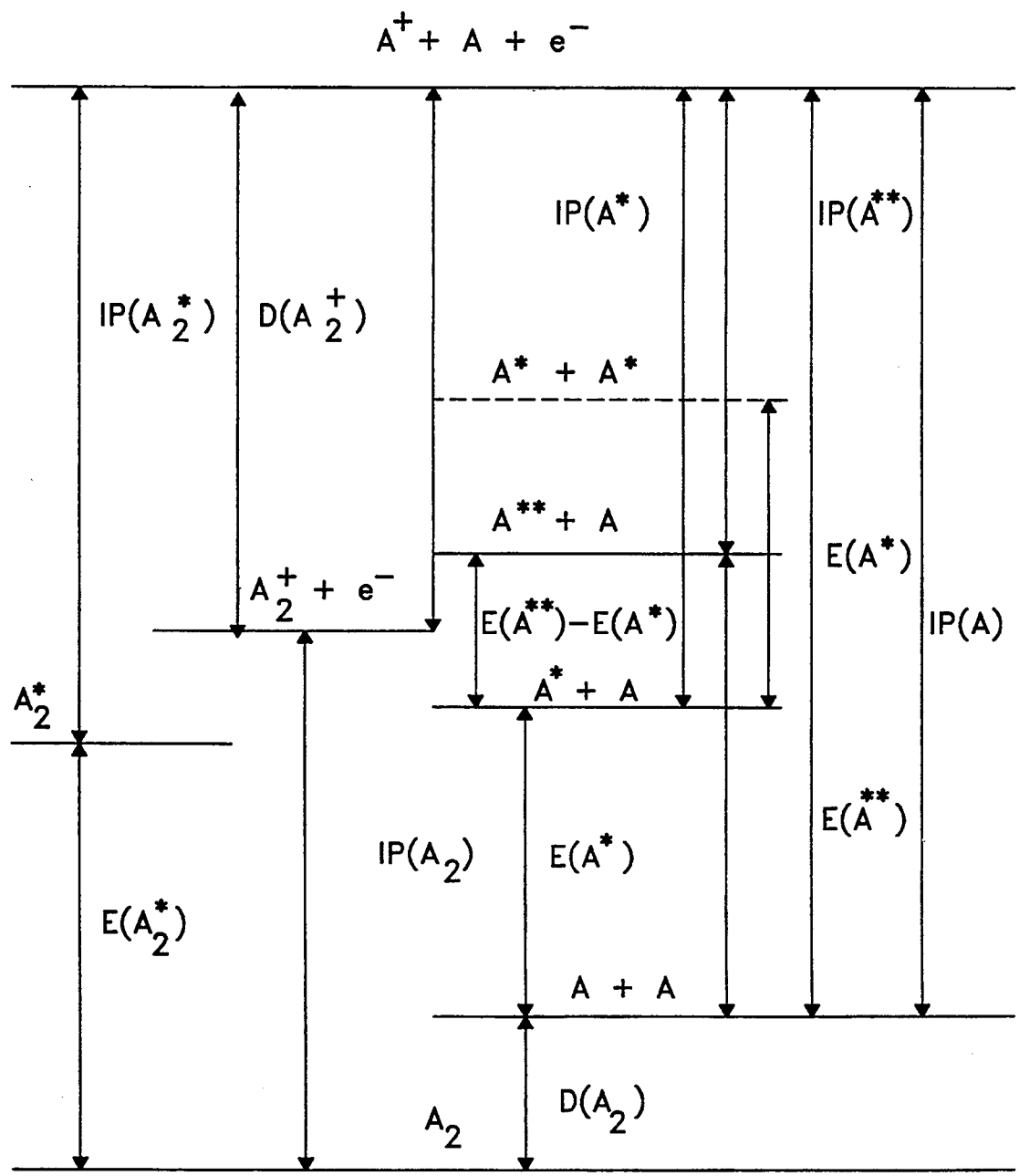
FIGS. 3A and 3B are graphical representations of various electronic states of a general gas and cesium, respectively.

FIG. 3A shows a generalized energy level diagram (or two-body energy cycle) for a single element medium A as gas 130. Medium A consists of ground state atoms (A) and molecules ($A_2$), excited atoms and molecules ($A^*$, $A^{**}$, $A_2^*$, where $A^*$ is atom A in an excited state, $A^{**}$ is atom A in another (higher) excited state and $A_2^*$ is molecule $A_2$ in an excited state) and their ions ($A+$ and $A_2+$) and electrons($e-$) (negative ions are neglected). FIG. 3A includes appropriate ionization potentials (IP), optical excitation energies (E), and bond dissociation energies (D) of atoms, molecules and ions in gas 130. Horizontal lines represent the energy of two A atoms in various combinations of electronic structure, bonding, and ionization.

On the left side of FIG. 3A it can be seen that $$E(A_2^*)+IP(A_2^*)=IP(A_2)+D(A_2+) \tag{1}$$

and $$IP(A_2)+D(A_2+)=D(A_2)+E(A^*)+IP(A^*). \tag{2}$$

Similarly other equations may be written $$E(A^{})+IP(A^{})=IP(A) \tag{3}$$

and $$D(A_2)+IP(A)=IP(A_2)+D(A_2+) \text{ etc..} \tag{4}$$

When the photon energy (hv) in laser beam 144 is equal to one of the energy differences, an electronic transition corresponding to the double arrow is possible. For example, as shown in FIG. 3A in direct photo-ionization of $A^*$, hv is equal to or greater than $IP(A^*)$. For a resonant excitation, hv can be equal to $E(A^*)$ (where A in its ground state undergoes a transition to $A^*$ representing A in a first excited state) or $E(A^{})$ (where A in its ground state undergoes a transition to $A^{}$ representing A in a second excited state). Hence, for a quasi-resonant excitation, hv is equal to $E(A^{**})-E(A^*)$.

Collisions are represented in FIG. 3A by horizontal lines. For example, the horizontal line beneath $A^* + A$ represents the energy of a collision between $A^*$ and A. Three examples will now be given of how gas 130 (i.e., atoms A and molecules $A_2$) can be excited. The three examples are direct photo-ionization, associative ionization and Penning ionization.

In direct photo-ionization, photons from laser beam 144 have sufficient energy (hv) to ionize constituents of gas 130 directly by absorption.

$$A+hv \to A^+ +e^{-1} \tag{5}$$

$$A_2+hv \to A_2^+ +e^- \tag{6}$$

$$A+hv \to A^* \tag{7a}$$

$$A^*+hv \to A^+ +e^- \tag{7b}$$

$$A_2+hv \to A_2^* \tag{8a}$$

$$A_2^*+hv \to A_2^+ +e^- \tag{8b}$$

In Equations 5 and 6 ground state atoms A and molecules $A_2$ are directly photo-ionized ($\to$ is read: ". . . is transformed into . . ."). In Equations 5 and 6 the necessary conditions are that $hv \geq IP(A)$ and $hv \geq IP(A_2)$ (see FIG. 3A). In Equations 7a and 7b atoms A are ionized in two steps. Namely, atoms A are first electronically excited which requires that $(hv=E(A^*))$ and then photoionized which requires that $hv \geq IP(A^*)$. Equations 8a and 8b represent an analogous mechanism for molecules $A_2$($hv=E(A_2^*)$ and $hv \geq IP(A_2^*)$).

In associative ionization, ions are produced as a result of collisions involving electronically excited atoms and molecules ($A^*$, $A^{**}$, $A_2^*$). Consider the mechanism represented by Equation 9 ($A^*$ are formed via Equation 7a), wherein an excited atom ($A^*$) collides with a ground state atom (A) and associatively ionizes to produce a dimer ion ($A_2+$) and an electron.

$$A^*+A \to A_2^+ +e^- \tag{9}$$

$$A^*+A^* \to A_2^+ +e^- \tag{10}$$

Using exoergicity as the criterion for spontaneity Equation 9 will proceed spontaneously (from left to right) provided that (see FIG. 3A), $$E(A^*)+D(A_2) \geq IP(A_2). \tag{11}$$

However, FIG. 3A shows instead that $$E(A^*)+D(A_2)<IP(A_2) \tag{12}$$

and therefore, the mechanism represented by Equation 9 will not proceed spontaneously and consequently will not produce ions. However, equation 10 can proceed spontaneously, if $$2E(A^*) + D(A_2) \geq IP(A_2).$$

FIG. 3A shows that indeed Equation 13 holds and therefore the mechanism represented by Equation 10 will proceed spontaneously. Furthermore, the mechanism $$A^{**} + A \rightarrow A_2^+ + e^- \qquad (14)$$

also proceeds spontaneously (since $E(A^{}) + D(A_2) > IP(A_2)$). Hence, another way to produce a quasi-resonant excitation of A, is to select a laser 140 which outputs photons (144) having frequencies such that $h\nu = E(A^{}) - E(A^*)$. Ionization then occurs spontaneously due to the associative ionization mechanisms represented by Equations 10 and 14. There are other associative ionization mechanisms that involve electronically excited molecules ($A_2^*$).

In Penning ionization, ions are also produced by collisions involving excited atoms and molecules. For example, $$A^{} + A^{} \rightarrow A^+ + A + e^- \qquad (15)$$

$$A^{**} + A_2 \rightarrow A_2^+ + A + e^-. \qquad (16)$$

By inspection of FIG. 3A, it can be seen that the mechanisms represented by Equations 15 and 16 will proceed spontaneously (since $2E(A^{}) > IP(A)$ and $D(A_2) + E(A^{}) > IP(A_2)$) when $h\nu = E(A^{})$ or $h\nu = E(A^{}) - E(A^*)$. Furthermore, the mechanism $$A^{**} + A \rightarrow A^+ + A + e^- \qquad (17)$$

will not proceed spontaneously because $E(A^{**}) < IP(A)$.

Finally, if a second element B had been chosen to be present, it would have been possible to use the mechanism $$A^* + B \rightarrow B^+ + A + e^- \qquad (18)$$

provided that $E(A^*) > IP(B)$.

The general principles discussed above with reference to FIG. 3A will be applied to the case where gas 130 includes ground state cesium atoms (Cs), electronically excited cesium atoms (Cs(6P), Cs(5D), etc.), cesium ions ($Cs^+$, $Cs_2^+$, $Cs_3^+$, and $Cs^-$) and electrons. Cesium dimers ($Cs_2$), cesium trimers ($Cs_3$) etc. and direct photoionization also left out. Second and third order collisional mechanisms are included.

Figure 3B:
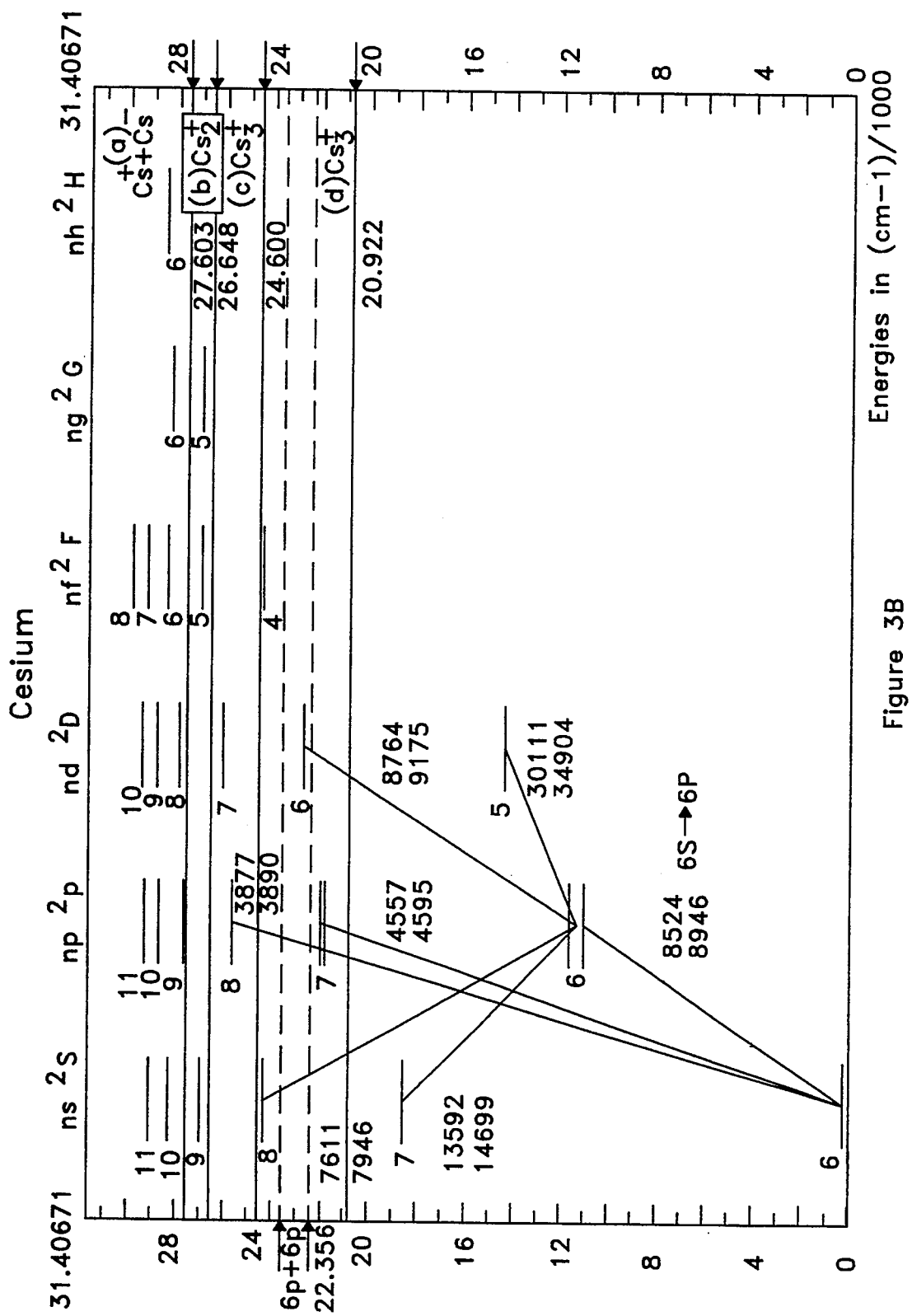

FIG. 3B shows a relevant energy level diagram (here a modified Grotrian diagram) for cesium. The vertical scale (energy) is in thousands of wavenumbers (cm−1). Atomic states are represented by short solid horizontal lines and are labeled by their principal quantum numbers (those in a given vertical column have the same angular momentum quantum number). Four long solid horizontal lines (labeled a–d) represent threshold energies for four collisional mechanisms to be discussed below. Two long dashed horizontal lines give the energy of the collision: Cs(6P)+Cs(6P) (both spin-orbit component combinations are shown).

Mechanism (a) in FIG. 3B produces an ion pair and may be written:

$$Cs^* + Cs \rightarrow Cs^+ + Cs^- \qquad (19)$$

The threshold for this transformation is at 27,603 cm−1. Hence the threshold excited atomic state for this mechanism is 9P. All cesium in atomic states that lie at the same or a higher energy than 9P can ionize by this mechanism (all cesium atomic states lower in energy than 9P cannot ionize by this mechanism).

Mechanism (b) in FIG. 3B is a second order associative ionization to form $Cs_2+$ and may be written $$Cs^* + Cs(6s) \rightarrow Cs_2^+ + e^-. \qquad (20)$$

Mechanism (b) has its threshold at 26,648 cm−1. Cesium in excited states 9S, 5F and 5G and higher will transform spontaneously by associative ionization and all cesium in states with energies lower than 26,648 cm−1 will not.

Mechanism (c) in FIG. 3B is a second order associative ionization to form $Cs_3^+$ (trimer ion formation), $$Cs^* + Cs_2 \rightarrow Cs_3^+ + e^-. \qquad (21)$$

Mechanism (c) has its threshold at 24,600 cm−1. Cesium atoms in excited states 8P, 7D and higher will transform spontaneously by this mechanism into $Cs_3^+$ and $e^-$. Cesium in states 8S and 4F are very near threshold and may ionize at sufficiently high temperatures. Cesium in states below 8S and 4F will not ionize.

Mechanism (d) in FIG. 3B is a third order associative ionization used to form $Cs_3^+$ and proceeds by the simultaneous collision of three atoms.

$$Cs^* + Cs(6S) + Cs(6S) \rightarrow Cs_3^+ + e^-. \qquad (22)$$

Mechanism (d) has its threshold at 20,922 cm−1 (third order mechanisms play an important role at high densities). In this case, cesium in states 7P, 6D and higher will spontaneously transform to give $Cs_3^+$ and $e^-$ and cesium atoms and molecules in states below 20,922 cm−1 will not spontaneously transform to give $Cs_3^+$ and $e-$.

The two dashed lines in FIG. 3B represent the energy of two colliding Cs(6P) atoms. The figure shows that the (second order) mechanism.

$$Cs(6P) + Cs(6P) \rightarrow Cs_2^+ + e^- \qquad (23)$$

will not proceed spontaneously since the dashed lines lie below the threshold for $Cs_2+$ formation (which is at 26,648 cm−1). However, the third order mechanism, $$Cs(6P) + Cs(6P) + Cs(6S) \rightarrow Cs_3^+ + e^- \qquad (24)$$

does proceed spontaneously since the dashed lines lie above the threshold for $Cs_3^+$ formation (which is at 20,922 cm−1).

To specify an electronic transition is to also specify possible mechanisms. For example, if laser 140 is used to excite one of the quasi-resonant transitions, $$Cs(6P) + h\nu \rightarrow Cs(5D) \qquad (25)$$

laser 140 would be an infrared laser tuned to either 3.0111 or 3.4904 microns and ionization would occur via the following third order mechanisms:

$$Cs(5D)+Cs(5D)+Cs(6S) \rightarrow Cs^+ + Cs^- + Cs(6S) \quad (26)$$

$$Cs(5D)+Cs(5D)+Cs(6S) \rightarrow Cs_2^+ + e^- + Cs(6S) \quad (27)$$

and $$Cs(5D)+cs(5D)+Cs(6S) \rightarrow Cs_3^+ + e^- \quad (28)$$

As another example, a near infrared laser at 0.8764 or 0.9175 micron would excite the quasi-resonant transition $$Cs(6P)+h\nu \rightarrow Cs(6D) \text{ and} \quad (29)$$

the primary mechanism of ionization would be $$Cs(6D)+Cs(6S)+Cs(6S) \rightarrow Cs_3^+ + e^-. \quad (30)$$

This process can become especially important because nearly every Cs(6D), once formed, results in ionization. Cs(6D) atoms that radiatively decay must do so primarily to the 6P state, the laser then re-excites these atoms back to the 6D state (they are radiatively trapped). If a Cs(6D) atom collides with a ground state cesium atom (6S), the following ("energy pooling") mechanism occurs, $$Cs(6D)+Cs(6S) \rightarrow Cs(6P)+Cs(6P). \quad (31)$$

The Cs(6P) atoms formed in Equation 31 are then returned to the 6D level by the laser in accordance with Equation 29. Together these mechanisms form an important "feedback" process. In addition, if two 6D atoms collide, Penning ionization will occur, i.e., $$Cs(6D)+Cs(6D) \rightarrow Cs^+ + Cs(6S) + e^-. \quad (32)$$

In this example, collisional mechanisms will tend to form Cs+ and Cs3+ but not Cs2+. The fact that these quasi-resonant plasmas exist at very low laser powers (<1 milliwatt) strongly suggest highly efficient "feedback" processes.

Figure 3C:
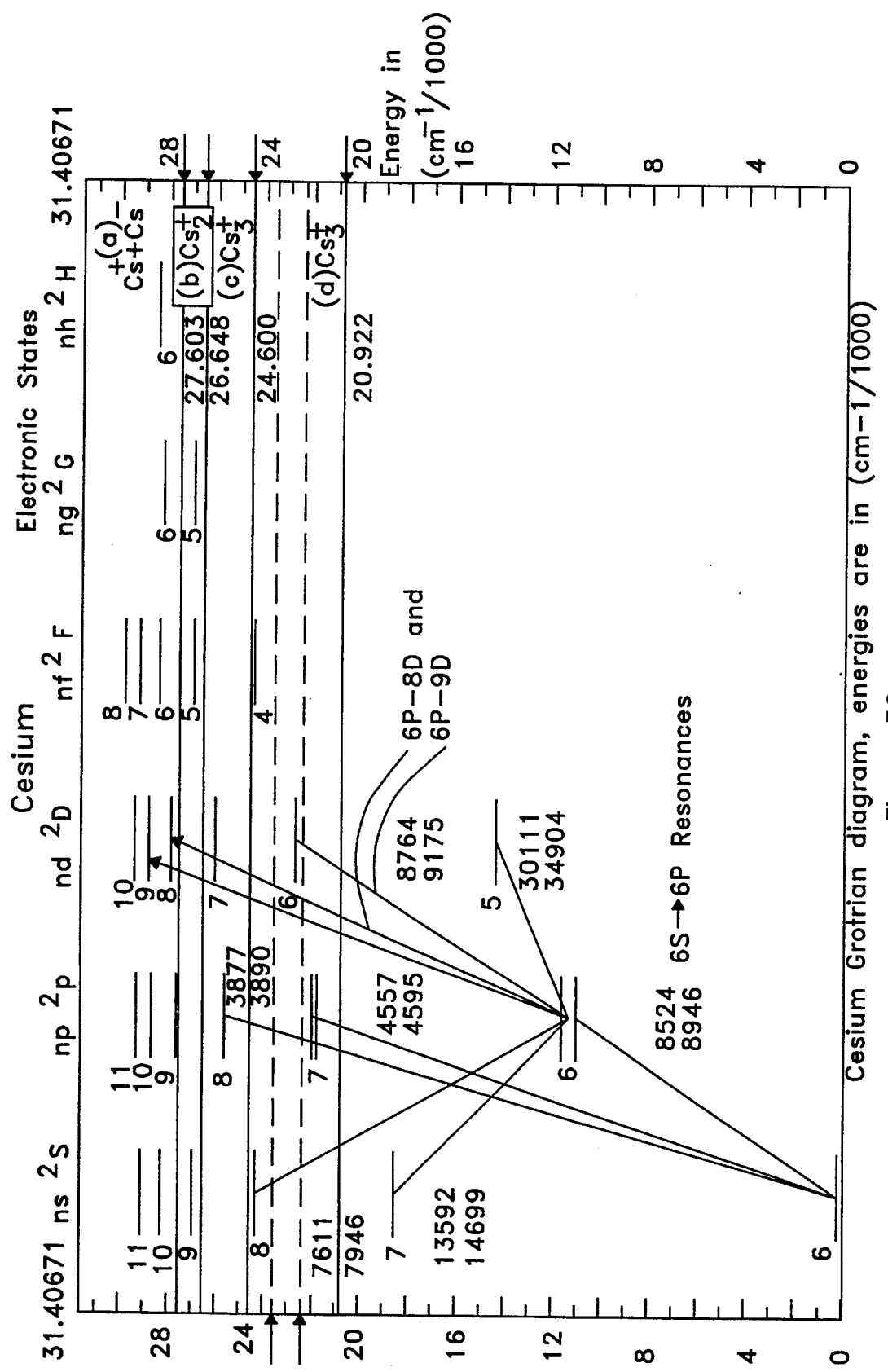
FIG. 3C is a graphical representation of various electronic states of cesium gas showing (arrows) quasi-resonances that have been used to make up cesium LGD.

FIG. 3C shows two quasi-resonances 6P-8D and 6P-9D of cesium to which a 10 milliwatt dye-laser (Coherent 599) was tuned. The 6P-8D transition corresponds to wavelengths of 601 or 621 nanometers and the 6P-9D transition corresponds to wavelengths of 567 or 585 nanometers. Note that the 6S electronic state is a ground state for cesium, and consequently, tuning laser 140 to the 6S-6P resonances (not quasi-resonances) at 852.4 and 894.6 nanometers would result in strong absorption of laser beam 144. This limits the size of LGD device 100 due to large attenuation of laser beam 144 by gas 130.

Since laser 140 is tuned to a quasi-resonance, it is only slightly attenuated as it travels from one electrode to the other, because the population of electronically excited 6P states is much smaller than that of the ground 6S states. Consequently, laser beam 144 can penetrate long distances in gas 130. This also makes it possible to scale LGD device 100 to high powers.

Figure 4:
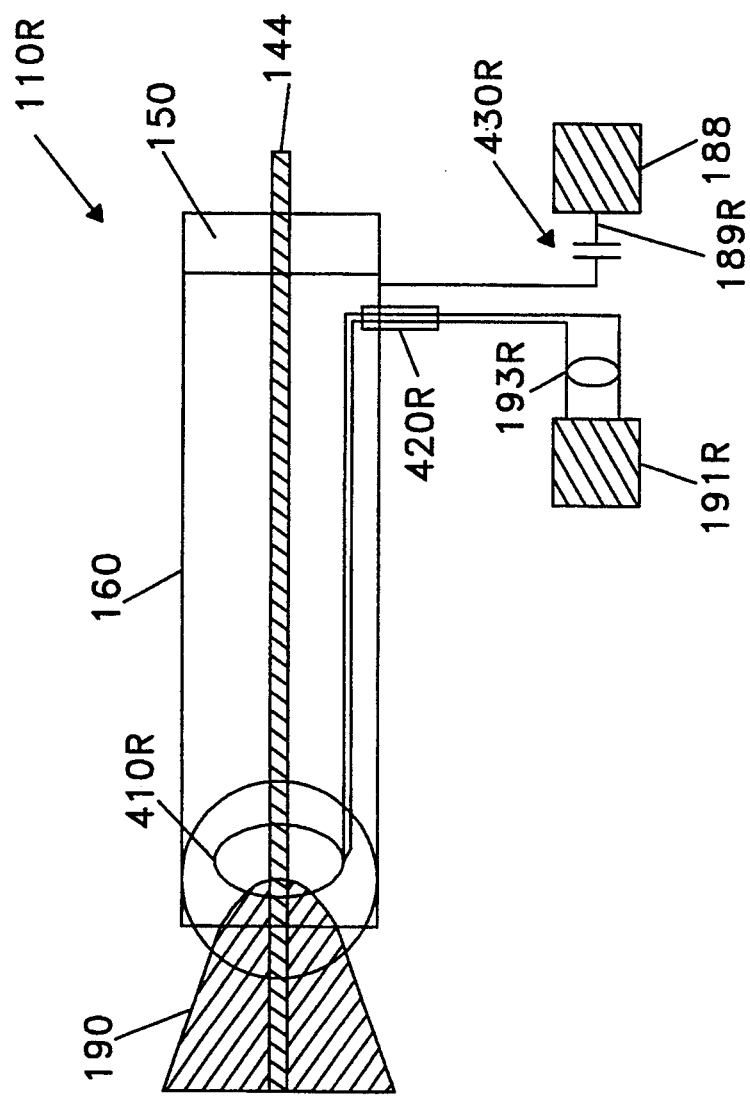
FIG. 4 is a schematic representation of the right electrode of the MALGD device with a nude filament.

FIG. 4 shows right electrode 110R with a nude filament 410R and insulation feed through 420R which insulates wires 193R from electrode wall 160. In this case, no insulator is used to insulate filament 410R at localized area 192R of low resistivity. Wire 189R is connected to wires 193R via a capacitor 430R. Capacitor 430R provides a dc block so that only higher frequency ac power from power source 188 reaches filament 410R. Filament 410R serves as both a heating element and electrode tip 170 and consequently the discharge current remains between left electrode 110L and right electrode 110R, while wall 160 remains electrically isolated from filament 410R.

Figure 5A:
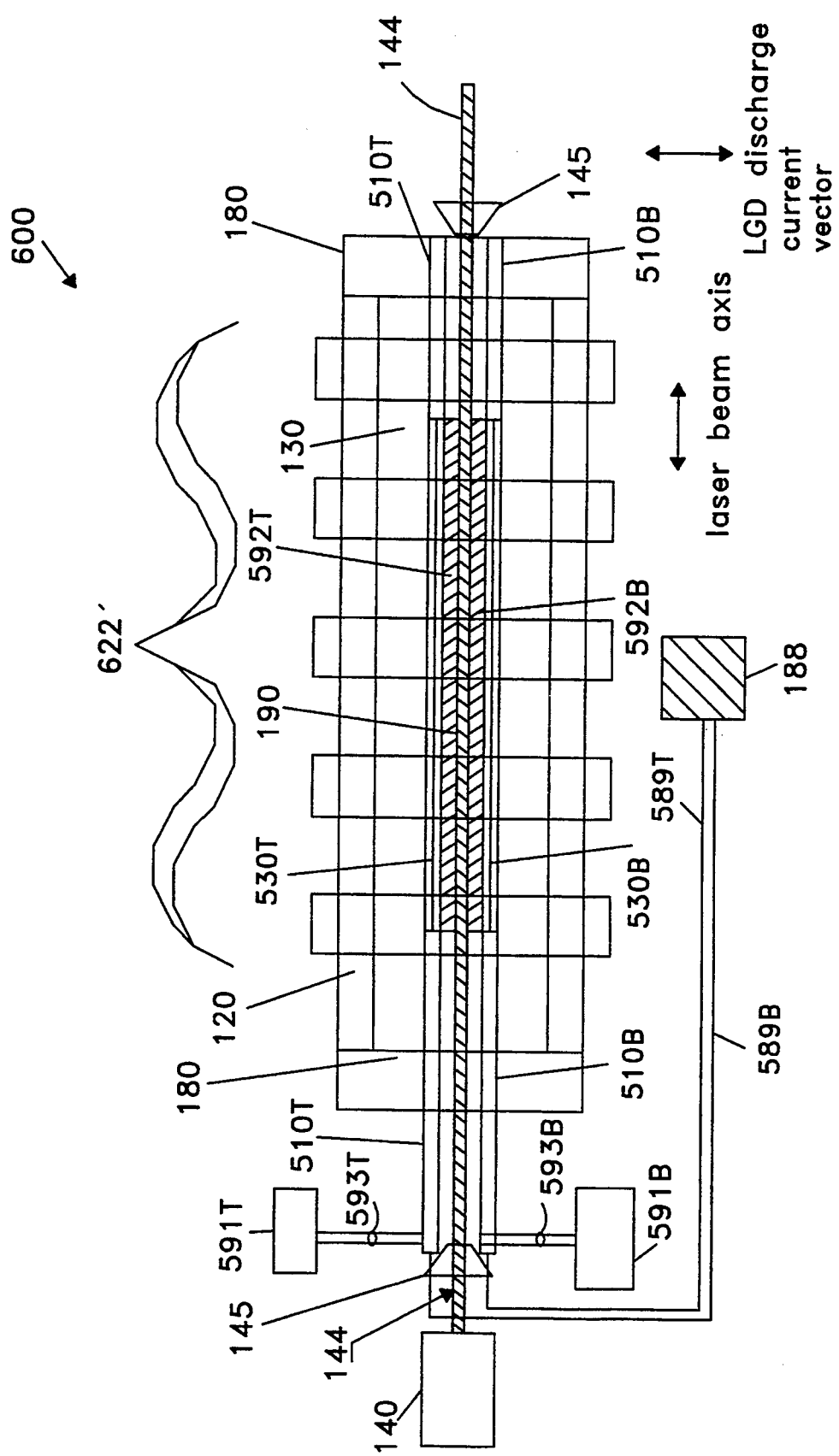
FIGS. 5A and 5B show a side and top view, respectively, of a transverse MALGD device 600', according to another embodiment of the invention.
Figure 5B:
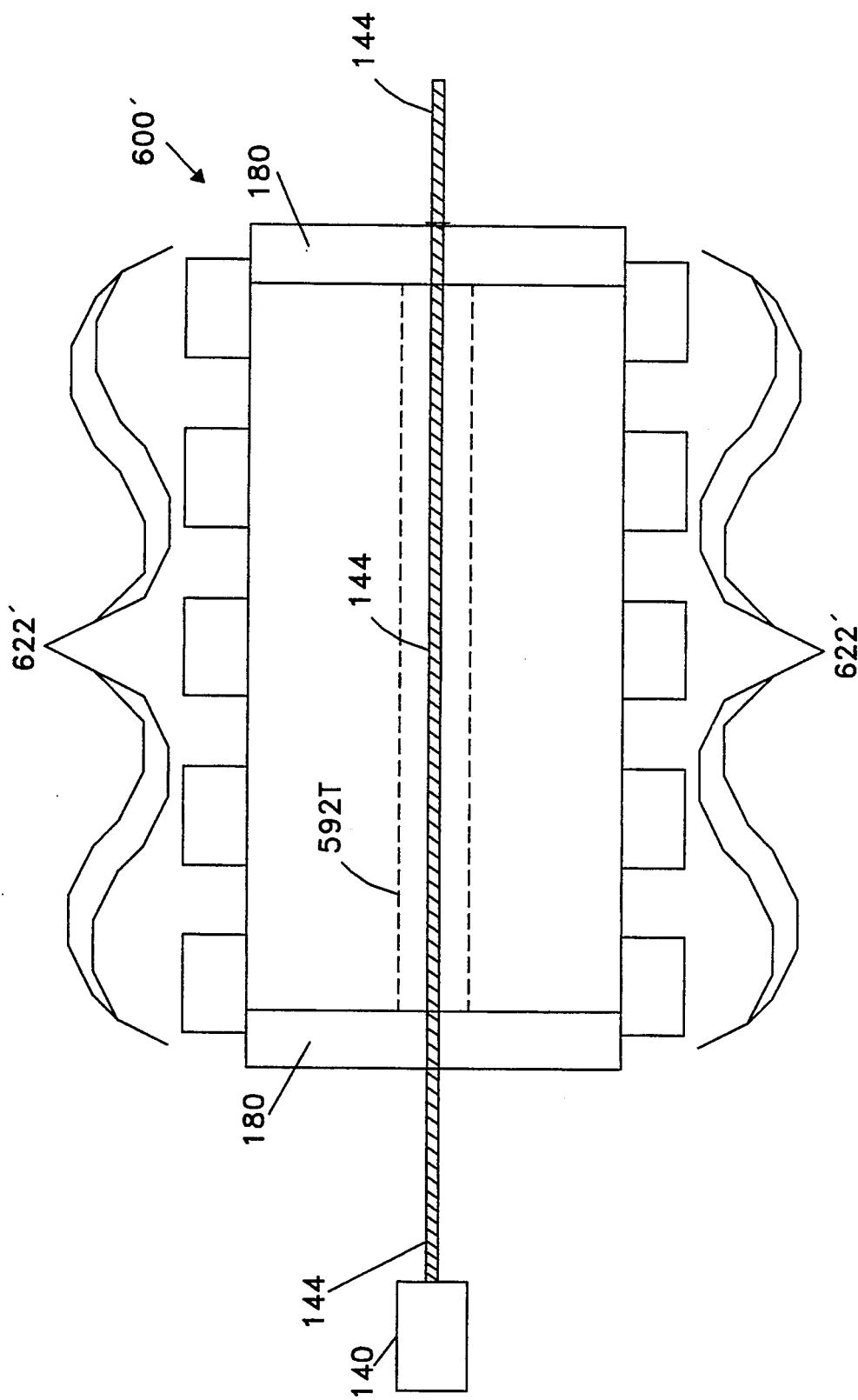

FIGS. 5A and 5B show a side and top view of a transverse MALGD device 600' respectively, according to another embodiment of the invention. Here, transverse MALGD device 600' is made using LGD device 500 in a transverse arrangement. Identical reference numerals are used for those elements of transverse MALGD device 600' which are common to longitudinal MALGD device 600 of FIGS. 1B and 1C. In this case, however, the direction of the electric discharge flow (i.e., the electric discharge current vector) is transverse to the path of beam 144. Also, instead of having left and right electrodes such as 110L and 110R in FIGS. 1B and 1C, transverse MALGD device 600' has a top electrode 510T and a bottom electrode 510B between which the discharge current is directed. A top conductive element 530T interconnects top electrodes 510T on the left and right hand sides of transverse MALGD device 600' and a bottom conductive element 530B interconnects bottom electrodes 510B on the left and right hand sides of transverse MALGD device 600'. As with longitudinal MALGD device 600, transverse MALGD device 600' can output photons 145 at either its left end or its right end. Plasma 190 is produced between top and bottom conductive elements 530T and 530B.

A top heating power source 591T is used to ionize gas 130 in the vicinity of top electrode 510T and top conductive element 530T. Again, this provides a conductive path to guide the discharge current between top electrode 510T with top conductive element 530T and bottom electrode 510B with bottom conductive element 530B connected to power source 188 via top and bottom wires 589T and 589B, respectively. Similarly, bottom heating power source 591B ionizes gas 130 in the vicinity of bottom electrode 510B and bottom conductive element 530B, thereby further aiding in producing the discharge current in the transverse direction as indicated in FIG. 5.

As with MALGD device 600, laser beam 144 is directed from the left side of transverse MALGD device 600' through gas 130 between top conductive element 530T and bottom conductive element 530B to the right hand side of transverse MALGD device 600'. Gas 130, between top and bottom conductive elements 530T and 530B, respectively, is ionized by laser beam 144, provided laser beam 144 fills a continuous space between the top and bottom conductive elements. Localized areas 592T and 592B (analogous to localized areas 192L and 192R for longitudinal MALGD device 600) which guide the discharge current, are formed using top and bottom heating power sources 591T and 591B, respectively, as will be discussed below. Top and bottom heating power sources 591T and 591B are connected to filaments (see FIG. 6) via wires 593T and 593B, respectively.

Figure 6:
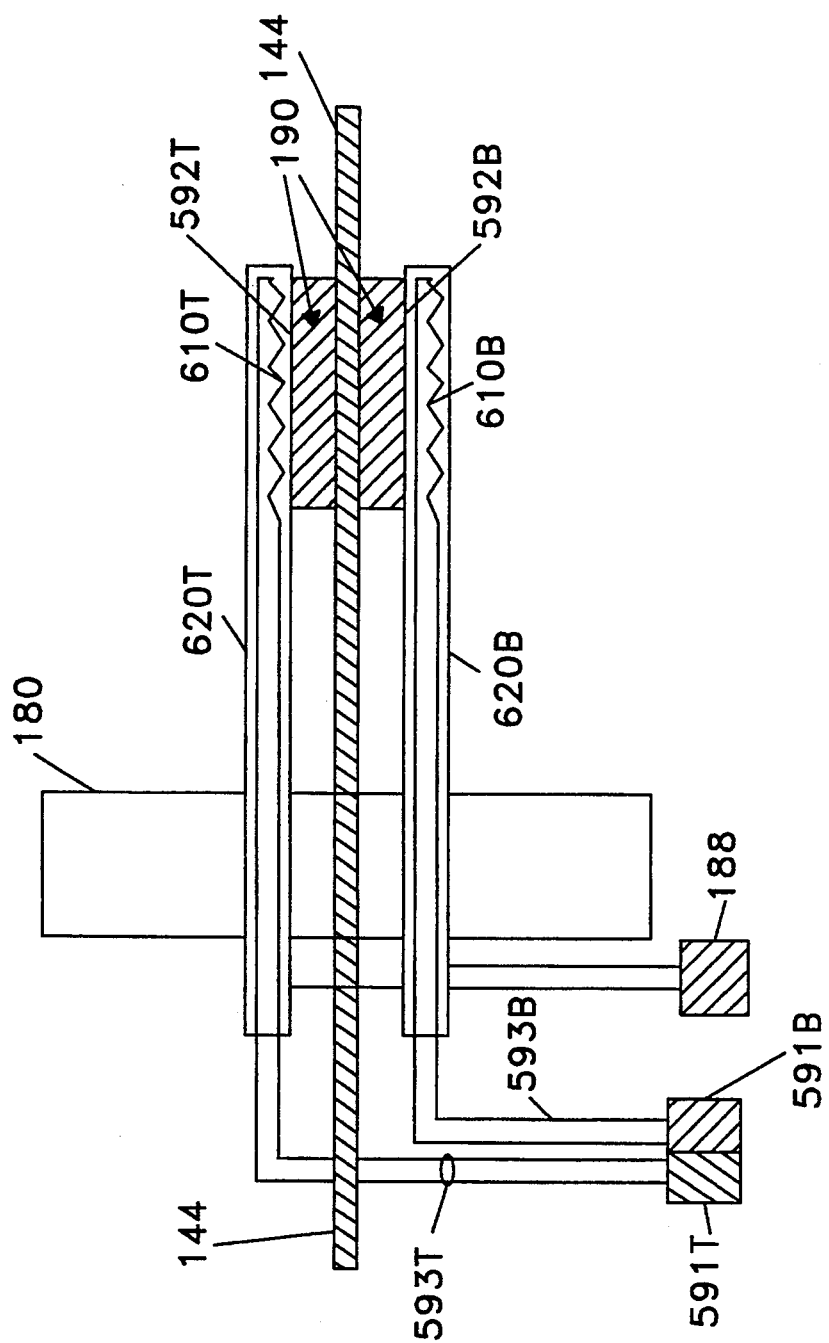
FIG. 6 is a more detailed schematic representation of the left-hand side of the transverse MALGD device using electrically insulated filaments.

FIG. 6 is a more detailed schematic representation of the left hand side of transverse MALGD device 600'. In particular, FIG. 6 shows how top and bottom heating power sources 591T and 591B are connected to top and bottom filaments or wires 610T and 610B via wires 593T and 593B, respectively. Top filament 610T and bottom filament 610B are electrically isolated from plasma 190 via top and bottom insulators 620T and 620B, respectively. Here, however, top and bottom localized areas 592T and 592B are located in the vicinity of top and bottom filaments 610T and 610B, respectively. Top and bottom filaments 610T and 610B together with respective top and bottom insulators 620T and 620B can extend along the entire length of respective top and bottom conductive elements 530T and 530B (FIG. 5).

Figure 7:
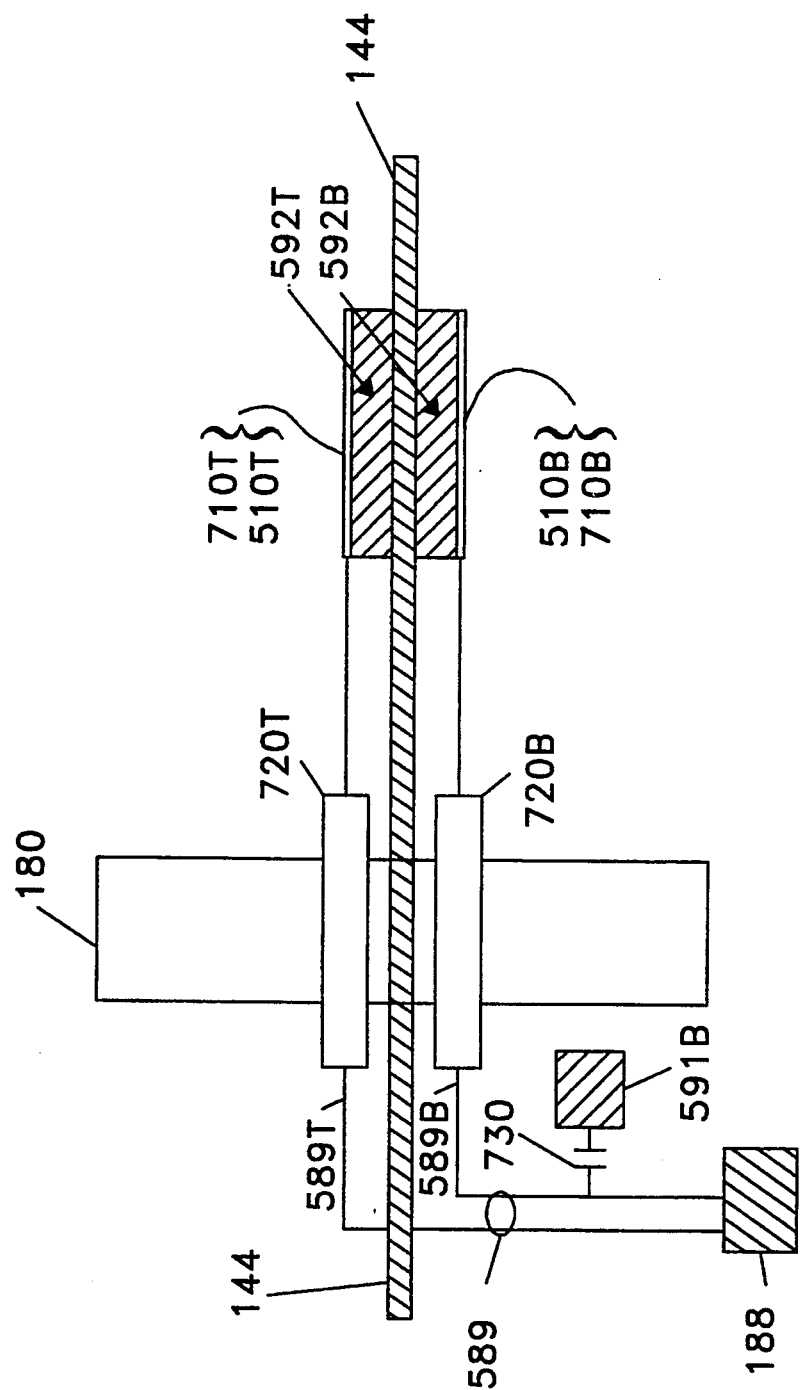
FIG. 7 is a more detailed schematic representation of the left-hand side of the transverse MALGD device using nude filaments.

FIG. 7 shows the left side of transverse MALGD device 600' using top and bottom electrodes 510T and 510B together with top and bottom nude filaments 710T and 710B, respectively. Here, a capacitor 730 is used as a dc block for power source 188 which in this case produces pulsed or ac voltages between top electrode 510T and bottom electrode 510B. Top and bottom electrical insulators 720T and 720B electrically insulate top wire 589T and bottom wire 589B from housing ends 180, hence, electrically insulating power source 188 from the housing ends 180 and walls 120 (see FIGS. 5A and 5B).

Figure 8:
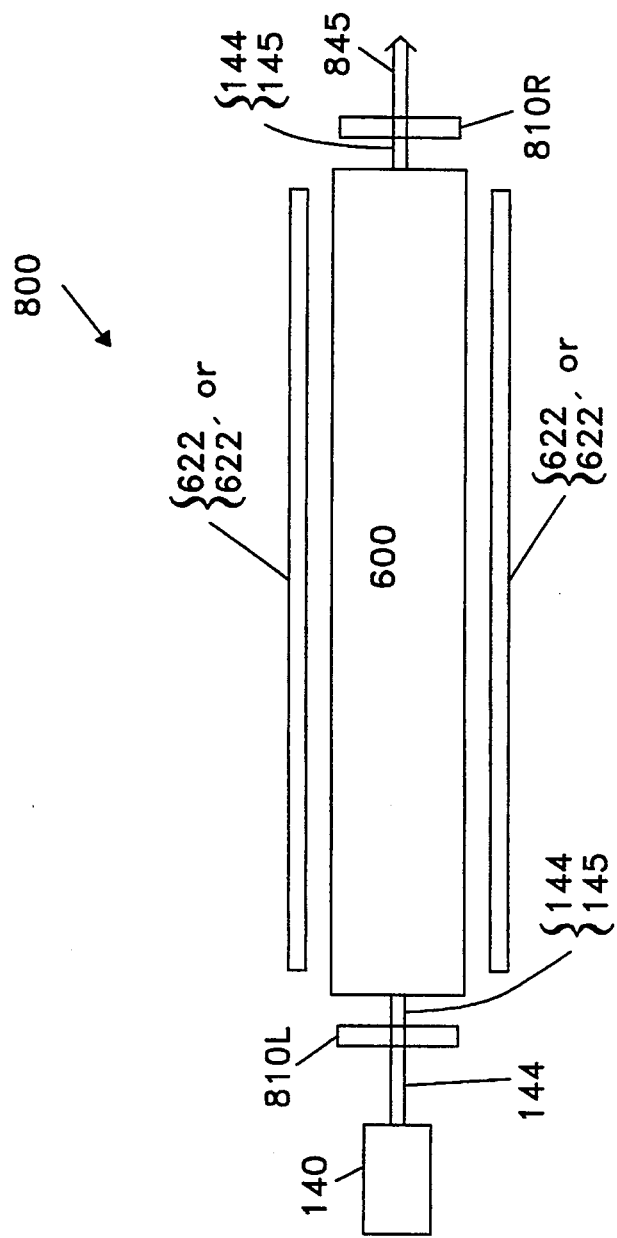
FIG. 8 is a schematic representation of a laser using the MALGD device in either a transverse or longitudinal configuration.

FIG. 8 shows how MALGD device 600 can be used in a laser 800 which outputs coherent photons 845 from output photons 145. A left and right reflector 810L and 810R are used to create a laser cavity. Either solenoid 622 or permanent magnet 622' or both can be employed. Leads 611L and 611R together with power supply 688 have not been shown here, it being understood that they are employed in an identical manner to that shown in FIG. 1B. Left reflector 810L should be partially transmissive for photons from laser beam 144 while being reflective for output photons 845 and 145 generated in plasma region 190 (see FIGS. 1B or 1C). On the other hand, right reflector 810R should be reflective for generated photons 145 in plasma region 190 and photons from laser beam 144 and partially transmissive for output photons 845. The output of laser 800 is coherent photons 845 which are those photons in output photons 145 which have been amplified as a result of being in a stable mode of a resonator formed from reflectors 810L and 810R.

Figure 9A:
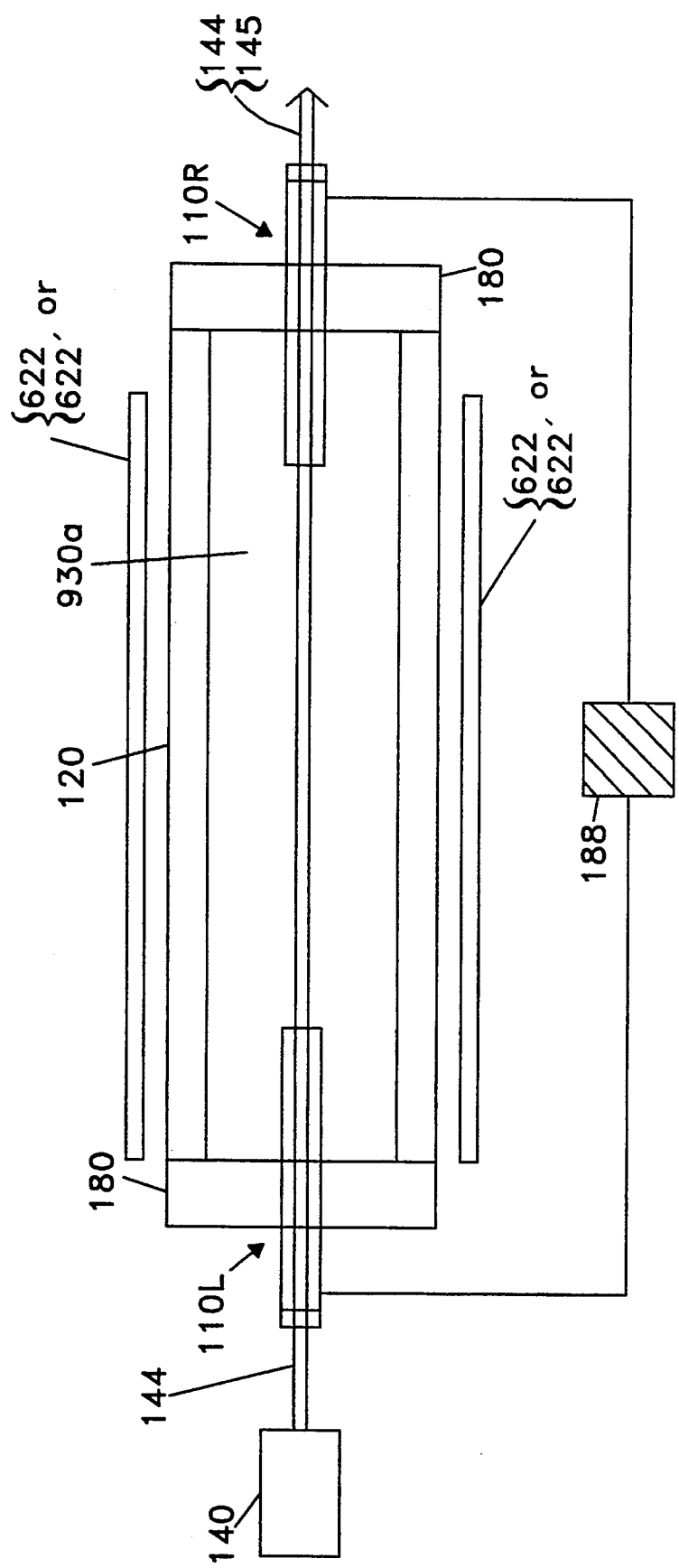
FIGS. 9A and 9B show the MALGD device in which the gas is replaced by a liquid and a solid, respectively.

FIG. 9A shows a longitudinal magnetically assisted laser guided discharge device 900a in which gas 130 is replaced with a liquid 930a. Again, leads 611L and 611R together with power supply 688 have not been shown here it being understood that they are employed in an identical manner to that shown in FIG. 1B. Also, the frequency of laser beam 144 output by laser 140 must be tuned to a quasi-resonance of liquid 930a, i.e., the energy of photons in laser beam 144 must be equal to the difference in energy between two excited electronic states in liquid 930a. Details of left and right electrodes 110L and 110R as well as heating power sources 191L and 191R have not been shown but are identical to those shown in FIG. 1A–1C. Examples of liquids 930a include water, alcohols, liquid hydrocarbons, liquid nitrogen and liquid argon.

Figure 9B:
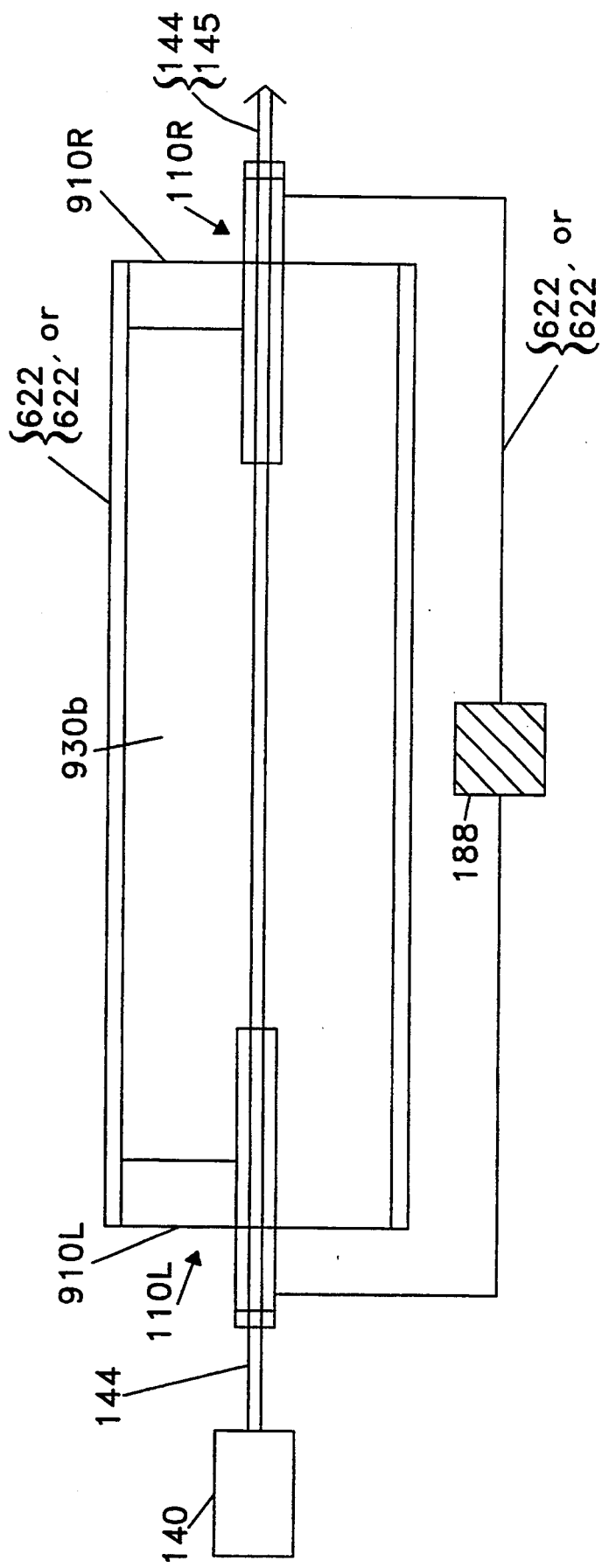

FIG. 9B shows a modification of MALGD device 600 in which gas 130 is replaced by a solid 930b having left and right sides 910L and 910R, respectively. As in FIG. 9A, details of left and right electrodes 110L and 110R, left and right heating power sources 191L and 191R and power supply 688 for solenoid 622 have been omitted for clarity. Again, laser 140 must output photons tuned to a quasi-resonance of solid 930b. Note that solid 930b need not have housing wall 120 or housing ends 180. Examples of solids 930b include doped semiconductors, doped glass, doped crystals and photoconductive materials.

Numerous and additional modifications and variations of the present invention are possible in light of the above teachings. It is therefore to be understood that within the scope of the appended claims, the invention may be practiced otherwise than as specifically claimed.

What is claimed is:

1. A device for generating and guiding an electric discharge, comprising:
   first and second electrodes;
   a material positioned between said first electrode and said second electrode, said material having at least two excited electronic states of different energies neither of which is a ground state;
   means for applying photons having an energy equal to the difference in energy between said two excited electronic states, said photons filling a region of the material between said first and second electrodes;
   means for applying a voltage across said first and second electrodes, whereby said electric discharge is generated and follows an ionized path in said region; and
   means for applying a magnetic field oriented in a direction approximately along said ionized path in order to further confine said electric discharge to follow said ionized path.

2. The device as claimed in claim 1, wherein said means for applying a magnetic field comprises a solenoid having a longitudinal axis oriented approximately parallel to said ionized path.

3. The device as claimed in claim 1, wherein said means for applying a magnetic field comprises a permanent magnet.

4. The device as claimed in claim 1, further comprising a housing having a first end and a second end for housing the material.

5. The device as claimed in claim 1, wherein said means for applying photons applies photons in a first direction and said first and second electrodes are arranged so that said ionized path is approximately perpendicular to said first direction.

6. The device as claimed in claim 1, wherein said means for applying photons applies photons in a first direction and said first electrode and second electrodes are arranged so that said ionized path is approximately parallel to said first direction.

7. The device as claimed in claim 1, wherein said material is a solid.

8. The device as claimed in claim 4, wherein said material is a gas.

9. The device as claimed in claim 4, wherein said material is a liquid.

10. The device as claimed in claim 3, wherein said permanent magnet surrounds a portion of said current discharge.

11. The device as claimed in claim 8, further comprising first and second filaments arranged along said first and second electrodes.

12. The device as claimed in 10, wherein said permanent magnet is cylindrical with an annular region having a longitudinal axis approximately parallel to said ionized path.

13. The device as claimed in claim 11, further comprising insulating means for insulating said first and second filaments, respectively, from the gas.

14. The device as claimed in claim 8, wherein the gas comprises cesium and argon.

15. The device as claimed in claim 1, wherein the material is selected so that the electric discharge causes the material to generate output photons.

16. The device as claimed in claim 15, further comprising a resonant optical cavity surrounding the material so that the device outputs laser radiation.

17. A device for generating and guiding an electric discharge current, comprising:

first and second electrodes;

a housing having a first end and a second end;

a gas contained in said housing, said gas having a quasi-resonance and positioned between said first electrode and said second electrode;

first and second filaments positioned along said first and second electrodes, respectively;

means for applying a current through said first and second filaments thereby heating and consequently ionizing said gas in a first and second vicinity of said first and second electrodes;

means for applying photons having an energy equal to the quasi-resonance, the photons filling a region of the gas between said first electrode and said second electrode;

means for applying a voltage between said first and second electrodes, whereby said electric discharge is generated which follows an ionized path in said region; and means for applying a magnetic field oriented approximately along said ionized path in order to further confine said electric discharge to follow said ionized path.

18. A method for guiding an electric discharge between a first and second electrode, comprising the steps of:

positioning a material between a first electrode and a second electrode, the material having at least two excited electronic states;

generating photons having energies equal to the difference in energy between the two excited electronic states of the material;

filling a region of the material between the first and second electrodes with said photons;

applying a voltage between the first and second electrodes, whereby said electric discharge follows an ionized path in said region; and applying a magnetic field oriented approximately along said ionized path in order to further confine said electric discharge to follow said ionized path.

19. The method as claimed in claim 18, further comprising the step of arranging the first electrode at a first side of a housing which contains the material and the second electrode at a second side of the housing.

* * * * *